US010755243B2

(12) United States Patent
Takeshita

(10) Patent No.: US 10,755,243 B2
(45) Date of Patent: Aug. 25, 2020

(54) INFORMATION PROCESSING APPARATUS, INFORMATION PROCESSING METHOD, INFORMATION MANAGEMENT APPARATUS, INFORMATION MANAGEMENT METHOD, RECORDING MEDIUM, AND INFORMATION PROCESSING SYSTEM

(71) Applicant: Sony Corporation, Tokyo (JP)

(72) Inventor: Naotaka Takeshita, Tokyo (JP)

(73) Assignee: Sony Corporation (JP)

(*) Notice: Subject to any disclaimer, the term of this patent is extended or adjusted under 35 U.S.C. 154(b) by 67 days.

(21) Appl. No.: 13/727,777

(22) Filed: Dec. 27, 2012

(65) Prior Publication Data
US 2014/0188698 A1  Jul. 3, 2014

(51) Int. Cl.
*G06Q 20/08* (2012.01)
*G06Q 20/32* (2012.01)
*G06Q 20/06* (2012.01)

(52) U.S. Cl.
CPC ......... *G06Q 20/08* (2013.01); *G06Q 20/0655* (2013.01); *G06Q 20/32* (2013.01)

(58) Field of Classification Search
CPC ............... G06Q 30/02; G06Q 30/0236; G06Q 30/0212; G06Q 30/0226; G06Q 30/0234; G06Q 30/0224; G06Q 30/0231; G06Q 30/0235; G06Q 30/0258
USPC ...................................................... 705/35–45
See application file for complete search history.

(56) References Cited

U.S. PATENT DOCUMENTS

| | | | | |
|---|---|---|---|---|
| 5,999,914 A | * | 12/1999 | Blinn | G06Q 30/02 705/14.1 |
| 6,996,402 B2 | * | 2/2006 | Logan | G06F 3/002 455/456.1 |
| 8,280,767 B1 | * | 10/2012 | Mikitani | H04L 51/28 705/1.1 |

(Continued)

FOREIGN PATENT DOCUMENTS

JP    2005317040 A    11/2005

OTHER PUBLICATIONS

Murphy, S. (2011). Focus on: Social media: A look at the latest facebook trends boosting loyalty, sales. Chain Store Age, 87(4), 86(1). Retrieved from http://dialog.proquest.com/professional/docview/1067758652?accountid=131444 on Apr. 21, 2020 (Year: 2011).*

*Primary Examiner* — Kito R Robinson
(74) *Attorney, Agent, or Firm* — Lerner, David, Littenberg, Krumholz & Mentlik, LLP

(57) ABSTRACT

An information processing apparatus includes a condition data obtaining unit configured to obtain condition data representing conditions of use of electronic money in a predetermined period of time from an information management apparatus which accepts access from a plurality of information processing apparatuses connected through a network, a condition determination unit configured to determine whether the conditions are satisfied in accordance with usage history of the electronic money stored in advance and the condition data, and a transmission unit configured to transmit, when the condition determination unit determines that the conditions are satisfied, application data including identification information for identifying an applicant to the information management apparatus.

6 Claims, 11 Drawing Sheets

(56) References Cited

U.S. PATENT DOCUMENTS

| | | | | |
|---|---|---|---|---|
| 8,755,511 | B2* | 6/2014 | Duva | G06Q 30/0246 379/201.01 |
| 9,947,057 | B2* | 4/2018 | Ransom | G06Q 30/02 |
| 10,366,419 | B2* | 7/2019 | Storti | G06Q 20/06 |
| 2002/0107733 | A1* | 8/2002 | Liu | G06Q 30/0211 705/14.13 |
| 2002/0128908 | A1* | 9/2002 | Levin | G06Q 30/02 705/14.53 |
| 2003/0110072 | A1* | 6/2003 | Delurgio | G06Q 30/0206 705/7.35 |
| 2004/0133472 | A1* | 7/2004 | Leason | G06Q 30/0238 705/14.14 |
| 2005/0021457 | A1* | 1/2005 | Johnson | G06Q 20/10 705/39 |
| 2005/0114208 | A1* | 5/2005 | Arbuckle | G06Q 30/02 705/14.16 |
| 2005/0202865 | A1* | 9/2005 | Kim | G06Q 30/02 463/17 |
| 2005/0240537 | A1* | 10/2005 | Li | G06O 30/06 705/80 |
| 2006/0235803 | A1* | 10/2006 | Romney | G06Q 20/367 705/65 |
| 2006/0259941 | A1* | 11/2006 | Goldberg | G11B 27/10 725/132 |
| 2007/0060276 | A1* | 3/2007 | Monahan | G06Q 30/02 463/17 |
| 2007/0088785 | A1* | 4/2007 | Cama | G06Q 10/107 709/206 |
| 2008/0208689 | A1* | 8/2008 | Johnson | G06Q 30/0234 705/14.14 |
| 2009/0144159 | A1* | 6/2009 | Bashyam | G06Q 30/0257 705/14.55 |
| 2009/0233640 | A1* | 9/2009 | Kurihara | G06Q 20/32 455/550.1 |
| 2010/0004996 | A1* | 1/2010 | Fujita | G06Q 20/105 705/14.64 |
| 2011/0141494 | A1* | 6/2011 | Yu | G06Q 20/20 358/1.6 |
| 2011/0238483 | A1* | 9/2011 | Yoo | G06O 30/02 705/14.38 |
| 2012/0066034 | A1* | 3/2012 | Nolan | G06Q 20/10 705/14.1 |
| 2013/0060641 | A1* | 3/2013 | Al Gharabally | H04H 60/63 705/14.66 |
| 2013/0282462 | A1* | 10/2013 | Xu | G06Q 30/0251 705/14.26 |
| 2014/0279060 | A1* | 9/2014 | Memarian | G06Q 30/0276 705/14.72 |
| 2014/0304701 | A1* | 10/2014 | Zhang | G06F 8/70 717/174 |
| 2015/0106928 | A1* | 4/2015 | Steinmann | H04L 63/145 726/23 |
| 2017/0124548 | A1* | 5/2017 | Bolla | H04W 4/80 |

* cited by examiner

| MONEY | xx ELECTRONIC MONEY |
|---|---|
| PERIOD | 08/15/2012 - 09/14/2012 |
| AMOUNT | 10000 YEN OR MORE |
| COUNT | |
| THE NUMBER OF WINNERS | 3000 PEOPLE |
| THE NUMBER OF WINNERS PER DAY | 100 PEOPLE |
| SAME USER MANAGEMENT | ON |

FIG. 6

| DATE AND TIME OF WINNING | 08/30/2012 |
|---|---|
| IC CHIP ID | 1qa3poi |
| ELECTRONIC MONEY | xx ELECTRONIC MONEY |
| USER INPUT INFORMATION | zzz@qqq.ne.jp |

FIG. 7

| PRIZE | xx ELECTRONIC MONEY 500 YEN |
|---|---|
| HOW TO RECEIVE | URL http://www.tony.co.jp/ ... |
| INQUIRY | ADDRESS, TELEPHONE NUMBER |
| NOTE | RECEIVE THE PRIZE WITHIN A MONTH FROM TODAY |

INFORMATION PROCESSING APPARATUS, INFORMATION PROCESSING METHOD, INFORMATION MANAGEMENT APPARATUS, INFORMATION MANAGEMENT METHOD, RECORDING MEDIUM, AND INFORMATION PROCESSING SYSTEM

BACKGROUND

The present technique relates to information processing apparatuses, information processing methods, information management apparatuses, information management methods, recording media, and information processing systems, and particularly relates to an information processing apparatus, an information processing method, an information management apparatus, an information management method, a recording medium, and an information processing system which are capable of providing services using electronic money of high value for users and electronic money companies.

In recent years, electronic money has been widely used. For example, services utilizing electronic money through IC cards, cellular phones, and smart phones have been widely provided.

A number of the services organize campaigns such as a campaign for offering a product by a drawing to users who use a predetermined amount of electronic money or who use electronic money a predetermined number of times within a predetermined period of time, for example.

Furthermore, a technique of combining a credit card function and electronic money has been also proposed (refer to Japanese Unexamined Patent Application Publication No. 2005-317040, for example).

SUMMARY

However, the electronic money is assumed to be used through IC cards, cellular phones, smart phones, and the like. Therefore, it is difficult to select users who satisfy campaign conditions from among owners of the IC cards, the cellular phones, and the smart phones, for example. Therefore, all the owners of the IC cards, the cellular phones, the smart phones, and the like receive a notification prompting participation in such a campaign in some cases.

Furthermore, in a case where a notification prompting participation in a campaign is issued at a time of use of the electronic money, a POS installed in a store or the like should be also operated. Therefore, in general, incentives such as points are given at a timing when a specific product is purchased in many cases and it is difficult to organize a campaign for promoting use of electronic money.

Furthermore, when a prize is given at the campaign, users who won the drawing should be identified. Therefore, all the users are obliged to perform user registrations in advance so that personal information of the users is disclosed in some cases. In this case, the users may hesitate to disclose the personal information, and therefore, the users may withhold the participation in the campaign.

Furthermore, in general, such a campaign is organized solely by an electronic money company in many cases, and it has not been assumed that a plurality of electronic money companies organize a campaign in cooperation with one another.

It is desirable to provide a service utilizing electronic money of high value for users and electronic money companies.

According to an embodiment of the present technique, there is provided an information processing apparatus including a condition data obtaining unit configured to obtain condition data representing conditions of use of electronic money in a predetermined period of time from an information management apparatus which accepts access from a plurality of information processing apparatuses connected through a network, a condition determination unit configured to determine whether the conditions are satisfied in accordance with usage history of the electronic money stored in advance and the condition data, and a transmission unit configured to transmit, when the condition determination unit determines that the conditions are satisfied, application data including identification information for identifying an applicant to the information management apparatus.

The information processing apparatus may further include a display unit configured to display a result of the determination made by the condition determination unit.

The information processing apparatus may access the information management apparatus in accordance with information obtained by accessing a service provision apparatus which is connected through the network and which provides products or services to be purchased using the electronic money for the information processing apparatus.

The information processing apparatus may further include a display unit configured to display a result of a drawing performed by the information management apparatus when the condition determination unit determines that the conditions are satisfied.

The information processing apparatus may further include a display unit configured to display an image which prompts a user to fill out an predetermined entry form when the condition determination unit determines that the conditions are satisfied.

Winner information generated in accordance with a result of the input to the entry form may be stored in the information management apparatus.

According to another embodiment of the present technique, there is provided an information processing method including obtaining condition data representing conditions of use of electronic money in a predetermined period of time from an information management apparatus which accepts access from a plurality of information processing apparatuses connected through a network, determining whether the conditions are satisfied in accordance with usage history of the electronic money stored in advance and the condition data, and transmitting, when the condition determination unit determines that the conditions are satisfied, application data including identification information for identifying an applicant to the information management apparatus.

According to still another embodiment of the present technique, there is provided a recording medium which records a program causing a computer to function as an information processing apparatus. The information processing apparatus includes a condition data obtaining unit configured to obtain condition data representing conditions of use of electronic money in a predetermined period of time from an information management apparatus which accepts access from a plurality of information processing apparatuses connected through a network, a condition determination unit configured to determine whether the conditions are satisfied in accordance with usage history of the electronic money stored in advance and the condition data, and a transmission unit configured to transmit, when the condition determination unit determines that the conditions are satisfied, application data including identification information for identifying an applicant to the information management apparatus.

Accordingly, condition data representing conditions of use of electronic money in a predetermined period of time is obtained from an information management apparatus which accepts access from a plurality of information processing apparatuses connected through a network, a determination whether the conditions are satisfied is made in accordance with usage history of the electronic money stored in advance and the condition data, and when it is determined that the conditions are satisfied, application data including identification information for identifying an applicant is transmitted to the information management apparatus.

According to yet another embodiment of the present technique, there is provided an information management apparatus including a condition data storage unit configured to store condition data representing conditions of use of electronic money in a predetermined period of time, a condition data transmission unit configured to transmit the condition data to a plurality of user terminals which access the information management apparatus through a network, and an application data reception unit configured to receive application data which includes identification information for identifying an applicant and which is transmitted from a user terminal, among the plurality of user terminals, which is determined to satisfy the conditions represented by the condition data.

The information management apparatus may be accessed by the plurality of user terminals in accordance with information obtained when the user terminals access a service provision apparatus which is connected to the user terminals through the network and which provides products or services to be purchased using the electronic money for the user terminals.

The information management apparatus may further include a drawing execution unit configured to perform a drawing to select a predetermined number of application data as application data of winners from among application data received by the application data reception unit in accordance with the condition data which further includes a condition associated with the number of winners.

The information management apparatus may further include a drawing result transmission unit configured to transmit information used to display a result of the drawing to the user terminals.

The drawing result transmission unit may further transmit information used to display an image which prompts a user to fill out a predetermined entry form to the winners.

The information management apparatus may further include a winner information storage unit configured to store winner information generated in accordance with a result of input to the entry form.

The information management apparatus may further include an e-mail transmission unit configured to transmit e-mails including information on reception of a prize to the winners in accordance with the winner information.

According to a further embodiment of the present technique, there is provided an information management method including transmitting condition data representing conditions of use of electronic money in a predetermined period of time to a plurality of user terminals which perform accesses through a network, and receiving application data which includes identification information for identifying an applicant and which is transmitted from a user terminal, among the plurality of user terminals, which is determined to satisfy the conditions represented by the condition data.

According to a still further embodiment of the present technique, there is provided a recording medium which records a program causing a computer to function as an information management apparatus. The information management apparatus includes a condition data storage unit configured to store condition data representing conditions of use of electronic money in a predetermined period of time, a condition data transmission unit configured to transmit the condition data to a plurality of user terminals which access the information management apparatus through a network, and an application data reception unit configured to receive application data which includes identification information for identifying an applicant and which is transmitted from a user terminal, among the plurality of user terminals, which is determined to satisfy the conditions represented by the condition data.

Accordingly, condition data representing conditions of use of electronic money in a predetermined period of time is stored, the condition data is transmitted to a plurality of user terminals which access the information management apparatus through a network, and application data which includes identification information for identifying an applicant and which is transmitted from a user terminal, among the plurality of user terminals, which is determined to satisfy the conditions represented by the condition data is received.

According to a yet further embodiment of the present technique, there is provided an information processing system including an information management apparatus and a user terminal. The information management apparatus includes a condition data storage unit configured to store condition data representing conditions of use of electronic money in a predetermined period of time, a condition data transmission unit configured to transmit the condition data to a plurality of user terminals which access the information management apparatus through a network, and an application data reception unit configured to receive application data which includes identification information for identifying an applicant and which is transmitted from a user terminal, among the plurality of user terminals, which is determined to satisfy the conditions represented by the condition data. The user terminal includes a condition data obtaining unit configured to obtain the condition data representing conditions of use of electronic money in a predetermined period of time from the information management apparatus, a condition determination unit configured to determine whether the conditions are satisfied in accordance with usage history of the electronic money stored in advance and the condition data, and a transmission unit configured to transmit, when the condition determination unit determines that the conditions are satisfied, application data including identification information for identifying an applicant to the information management apparatus.

Accordingly, the information management apparatus stores condition data representing conditions of use of electronic money in a predetermined period of time, transmits the condition data to a plurality of user terminals which access the information management apparatus through a network, and receives application data which includes identification information for identifying an applicant and which is transmitted from a user terminal, among the plurality of user terminals, which is determined to satisfy the conditions represented by the condition data. The user terminal obtains the condition data representing conditions of use of electronic money in a predetermined period of time from the information management apparatus, determines whether the conditions are satisfied in accordance with usage history of the electronic money stored in advance and the condition data, and transmits, when the condition determination unit determines that the conditions are satisfied, application data including identification information for identifying an applicant to the information management apparatus.

According to a yet further embodiment of the present technique, there is provided an information processing apparatus including a communication unit, a memory, and a controller. The controller externally obtains condition information representing conditions of use of electronic money in a predetermined period of time, determines whether usage history of the electronic money stored in the memory in advance satisfies the conditions in accordance with the condition information, and transmits notification data including identification information of the electronic money through the communication unit when it is determined that the conditions are satisfied.

According to a yet further embodiment of the present technique, there is provided an information processing method including externally obtaining condition information representing conditions of use of electronic money in a predetermined period of time by an information processing apparatus, determining whether the conditions are satisfied in accordance with usage history of the electronic money stored in advance and the condition information, and transmitting, when it is determined that the conditions are satisfied, notification data including identification information to an information management apparatus.

According to a yet further embodiment of the present technique, there is provided a recording medium which records a program causing a computer to function as an information processing apparatus which transmits notification data including identification information through a communication unit when a determination as to whether conditions are satisfied is affirmative in accordance with condition information representing the conditions of use of electronic money in a predetermined period of time which is externally obtained and usage history of the electronic money stored in a memory in advance.

Accordingly, condition information representing conditions of use of electronic money in a predetermined period of time is externally obtained, a determination as to whether the conditions are satisfied is made in accordance with usage history of the electronic money stored in advance and the condition information, and when it is determined that the conditions are satisfied, notification data including identification information is transmitted to an information management apparatus.

According to a yet further embodiment of the present technique, there is provided an information management apparatus including a communication unit, a memory, and a controller. The controller stores condition information representing conditions of use of electronic money of a user terminal in a predetermined period of time in the memory, transmits the condition information to the user terminal through the communication unit, and receives notification data including identification information which is transmitted from the user terminal which is determined that usage history of electronic money of the user terminal satisfies the conditions through the communication unit.

According to a yet further embodiment of the present technique, there is provided an information management method including transmitting condition information representing conditions of use of electronic money in a predetermined period of time to user terminals which perform accesses through a network, and receiving notification data which includes identification information transmitted from a user terminal, among the user terminals, which is determined that usage history of electronic money of the user terminal satisfies the conditions.

According to a yet further embodiment of the present technique, there is provided a recording medium which records a program causing a computer to function as an information management apparatus which stores condition information representing conditions of use of electronic money of a user terminal in a predetermined period of time in the memory, transmits the condition information to the user terminal through a communication unit, and receives notification data including identification information which is transmitted from the user terminal which is determined that usage history of electronic money of the user terminal satisfies the conditions through the communication unit.

Accordingly, condition information representing conditions of use of electronic money in a predetermined period of time is transmitted to user terminals which perform accesses through a network, and notification data which includes identification information transmitted from a user terminal, among the user terminals, which is determined that usage history of electronic money of the user terminal satisfies the conditions is received.

According to a yet further embodiment of the present technique, there is provided an information processing system including a user terminal and an information management apparatus. The user terminal includes a first communication unit, a first memory, and a first controller. The information management apparatus includes a second communication unit, a second memory, and a second controller. The second memory stores condition information representing conditions of use of electronic money of a user terminal in a predetermined period of time. The first controller externally obtains the condition information representing conditions of use of electronic money in a predetermined period of time, determines whether usage history of the electronic money stored in the first memory in advance satisfies the conditions in accordance with the condition information, and transmits notification data including identification information through the first communication unit when it is determined that the conditions are satisfied. The second controller receives the notification data transmitted from the user terminal which is determined that the usage history of electronic money of the user terminal satisfies the conditions.

Accordingly, the user terminal externally obtains condition information representing conditions of use of electronic money in a predetermined period of time, determines whether the conditions are satisfied in accordance with usage history of the electronic money stored in advance and the condition information, and transmits notification data including identification information to the information management apparatus when it is determined that the conditions are satisfied. Furthermore, the information management apparatus transmits condition information representing conditions of use of electronic money in a predetermined period of time to the user terminal which accesses the information management apparatus through a network and receives notification data transmitted from the user terminal which is determined that usage history of electronic money of the user terminal satisfies the conditions.

According to the present technique, services using electronic money of high value for users and electronic money companies are provided.

BRIEF DESCRIPTION OF THE DRAWINGS

FIG. 6 is a diagram illustrating winning information;

FIG. 7 is a diagram illustrating information included in an electric mail transmitted to winners;

DETAILED DESCRIPTION OF EMBODIMENTS

Hereinafter, an embodiment of the present technique will be described with reference to the accompanying drawings.

Figure 1:
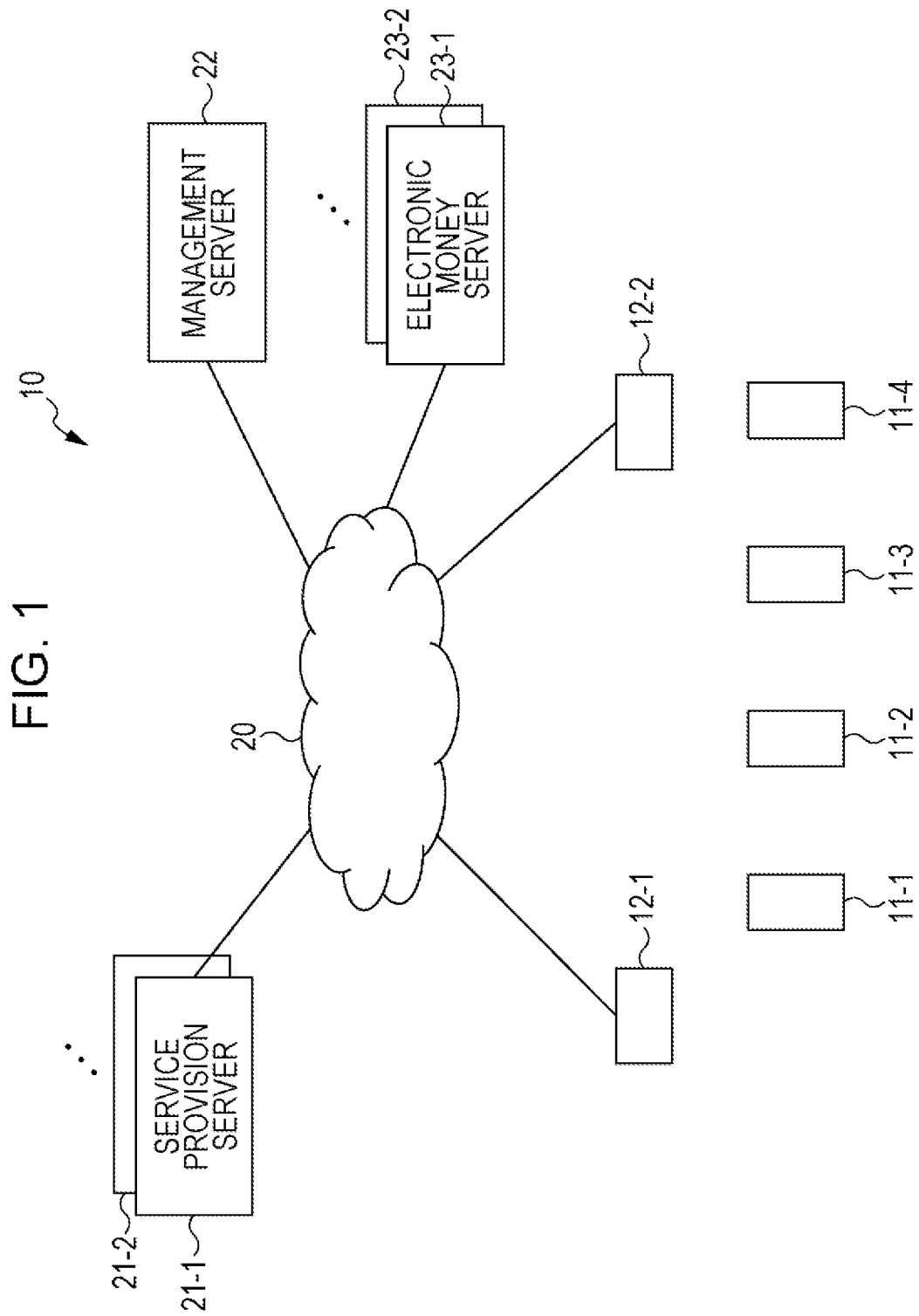
FIG. 1 is a diagram illustrating a configuration of a service provision system according to the present technique.

FIG. 1 is a diagram illustrating a configuration of a service provision system according to the present technique.

A service provision system 10 illustrated in FIG. 1 includes mobile terminals 11-1 to 11-4, access points 12-1 and 12-2, a network 20, service provision servers 21-1, 21-2, and so on, a management server 22, and electronic money servers 23-1, 23-2, and so on.

Note that when the service provision servers 21-1, 21-2, and so on are not distinguished from one another, the service provision servers 21-1, 21-2, and so on are collectively referred to as a service provision server 21. Furthermore, when the electronic money servers 23-1, 23-2, and so on are not distinguished from one another, the electronic money servers 23-1, 23-2, and so on are collectively referred to as an electronic money server 23.

Moreover, although the mobile terminals 11-1 to 11-4 are illustrated in this embodiment, a larger number of mobile terminals are used in practice. When the mobile terminals 11-1 to 11-4 are not distinguished from each other, the mobile terminals 11-1 to 11-4 are collectively referred to as a mobile terminal 11.

In the service provision system 10, a user may purchase products and services by electronic money. Furthermore, a plurality of types of electronic money are usable in the service provision system 10, and the different types of electronic money are provided by different electronic money companies.

Each of the mobile terminals 11-1 to 11-4 is configured as an electronic apparatus such as a smart phone or a tablet terminal carried by a user A, a user B, a user C, or a user D, for example.

The mobile terminal 11 incorporates application programs for receiving services using the electronic money.

The mobile terminal 11 is connected to the network 20 such as the Internet through the access point 12-1 or the access point 12-2. The mobile terminal 11 accesses the service provision server 21 connected to the network 20 and receives the services using the electronic money.

For example, a user may access the service provision server 21 using the mobile terminal 11 so as to purchase a product or a service by the electronic money. Furthermore, the user may access the electronic money server 23, for example, so as to recharge the electronic money in an IC chip included in the mobile terminal through a reader/writer, not shown.

Furthermore, the mobile terminal 11 stores usage history of the electronic money. For example, the mobile terminal 11 stores a predetermined number of history records which include information on payment amounts, payment dates and times, recharging amounts, and recharging dates and times.

Furthermore, the mobile terminal 11 receives an XML (Extensible Markup Language) file transmitted from the management server 22 through the network 20 and executes a process corresponding to description content of the XML file.

The service provision server 21 is managed by a mail-order dealer or the like and sells various products and various services through the network 20 such as the Internet. When the products and the services are purchased from the service provision server 21, electronic money is used.

It is assumed that the different service provision servers 21-1, 21-2, and so on are managed by different mail-order dealers. For example, the service provision server 21-1 is managed by a company A and the service provision server 21-2 is managed by a company B.

The management server 22 is managed by an event planning company, for example.

An operator of the management server 22 organizes a campaign in response to a request from an electronic money company, for example. For example, the operator of the management server 22 organizes a campaign for offering 500 yen to users who spend electronic money a predetermined number of times or a predetermined amount of electronic money within a predetermined period of time by lot so that use of the electronic money is promoted.

The operator of the management server 22 requests the companies A, B, and so on which manage the service provision servers 21-1, 21-2, and so on to display a URL of the management server 22 for the users who purchase the products or the services by the electronic money within the predetermined period of time. By this, the mobile terminal 11 of the user who uses the electronic money accesses the management server 22.

The operator of the management server 22 generates an XML file including information on application requirements of the campaign and information on a winning conditions and stores the XML file in the management server 22. For example, the XML file is automatically generated by inputting predetermined information to the management server 22.

The management server 22 transmits the XML file to the mobile terminal 11 which accesses the management server 22. By this, the mobile terminal 11 refers to the usage history of the electric money stored in the mobile terminal 11 itself so as to determine whether the mobile terminal 11 is qualified to apply the campaign.

Furthermore, the management server 22 determines whether the user of the mobile terminal 11 which has applied the campaign is a winner of the campaign.

Moreover, the management server 22 stores an entry form transmitted from the mobile terminal 11 of the user who is a winner of the campaign and transmits information on a procedure of reception of the prize to a contact address (such as an e-mail address) described in the entry form where appropriate.

The electronic money server 23 which is managed by the electronic money company stores an ID of an IC chip which stores information on electronic money and which is incorporated in the mobile terminal 11, for example. Furthermore, the electronic money server 23 obtains the ID of the IC chip of the mobile terminal 11 which requests recharge of the electronic money, for example. When it is determined that the IC chip is valid, the electronic money is recharged in the IC chip.

It is assumed that the different electronic money servers 23-1, 23-2, and so on are managed by different electronic money companies. For example, the electronic money server 23-1 is managed by a company X and electronic money which is recharged by accessing the electronic money server 23-1 is referred to as "XX electronic money". For example, the electronic money server 23-2 is managed by a company Y and electronic money which is recharged by accessing the electronic money server 23-2 is referred to as "YY electronic money".

Figure 2:
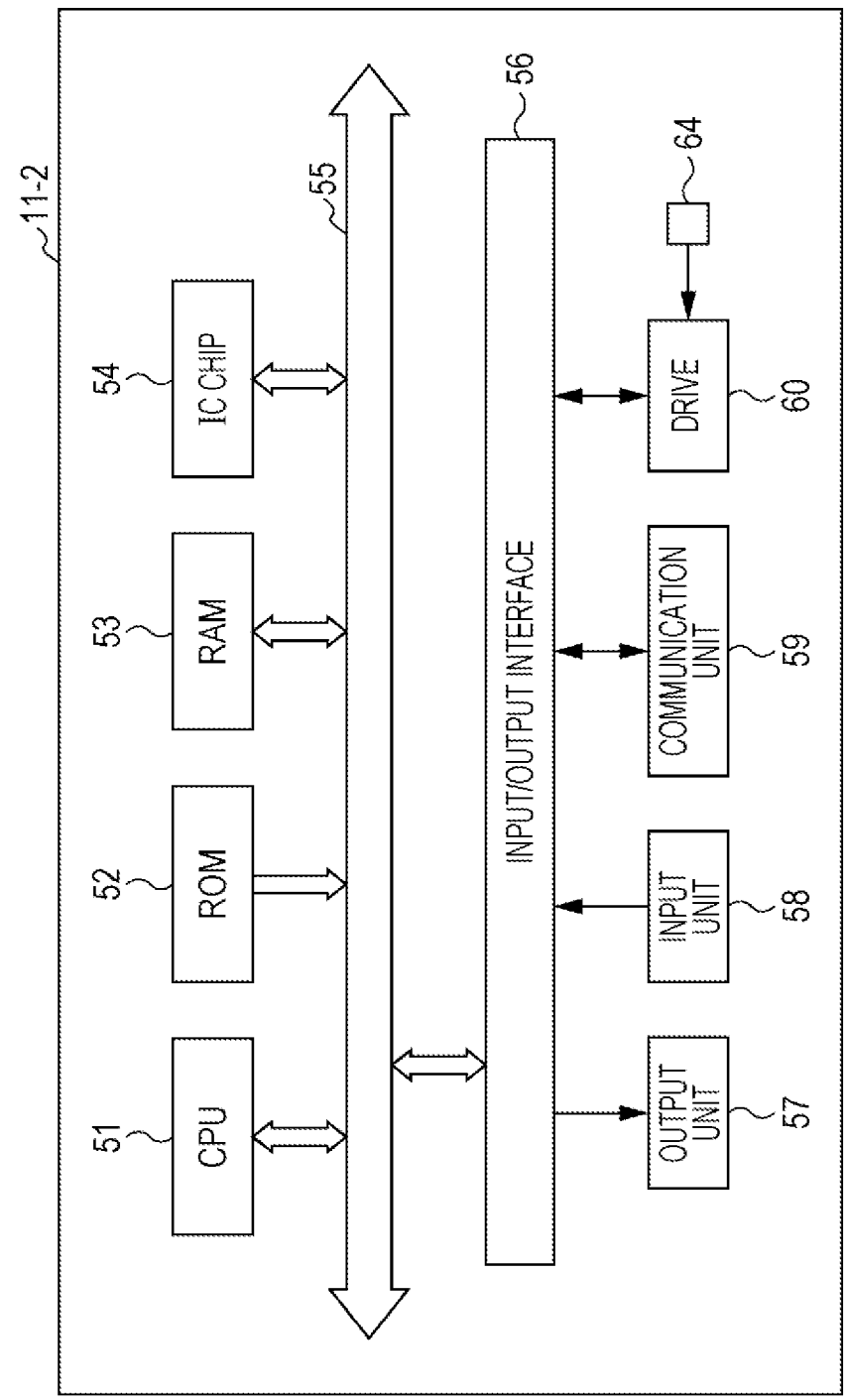
FIG. 2 is a block diagram illustrating a configuration of a mobile terminal illustrated in FIG. 1.

FIG. 2 is a block diagram illustrating a configuration of the mobile terminal 11 illustrated in FIG. 1.

In FIG. 2, an input/output interface 56 is connected to a CPU (Central Processing Unit) 51 through a bus 55.

When the user issues an instruction using an input unit 58 including a key board and a mouse through the input/output interface 56, for example, the CPU 51 loads a program stored in a recording medium such as a ROM (Read Only Memory) 52 or a semiconductor memory 64 which is inserted into a drive 60 into a RAM (Random Access Memory) 53 and executes the program.

Furthermore, the CPU 51 outputs a result of the processing to an output unit 57 including an LCD (liquid Crystal Display) through the input/output interface 56, for example. A communication unit 59 performs wireless communication with the access points 12-1 and 12-2.

Furthermore, the mobile terminal 11 includes an IC chip 54 which stores various data regarding electronic money. The IC chip 54 is issued by the electronic money companies as a secure IC chip having tamper resistant.

The IC chip 54 transmits data to and receives data from the reader/writer, not shown, by a contact manner or a non-contact manner. Furthermore, the IC chip 54 performs encryption processing on the data to be transmitted and received for ensuring the security.

Figure 3:
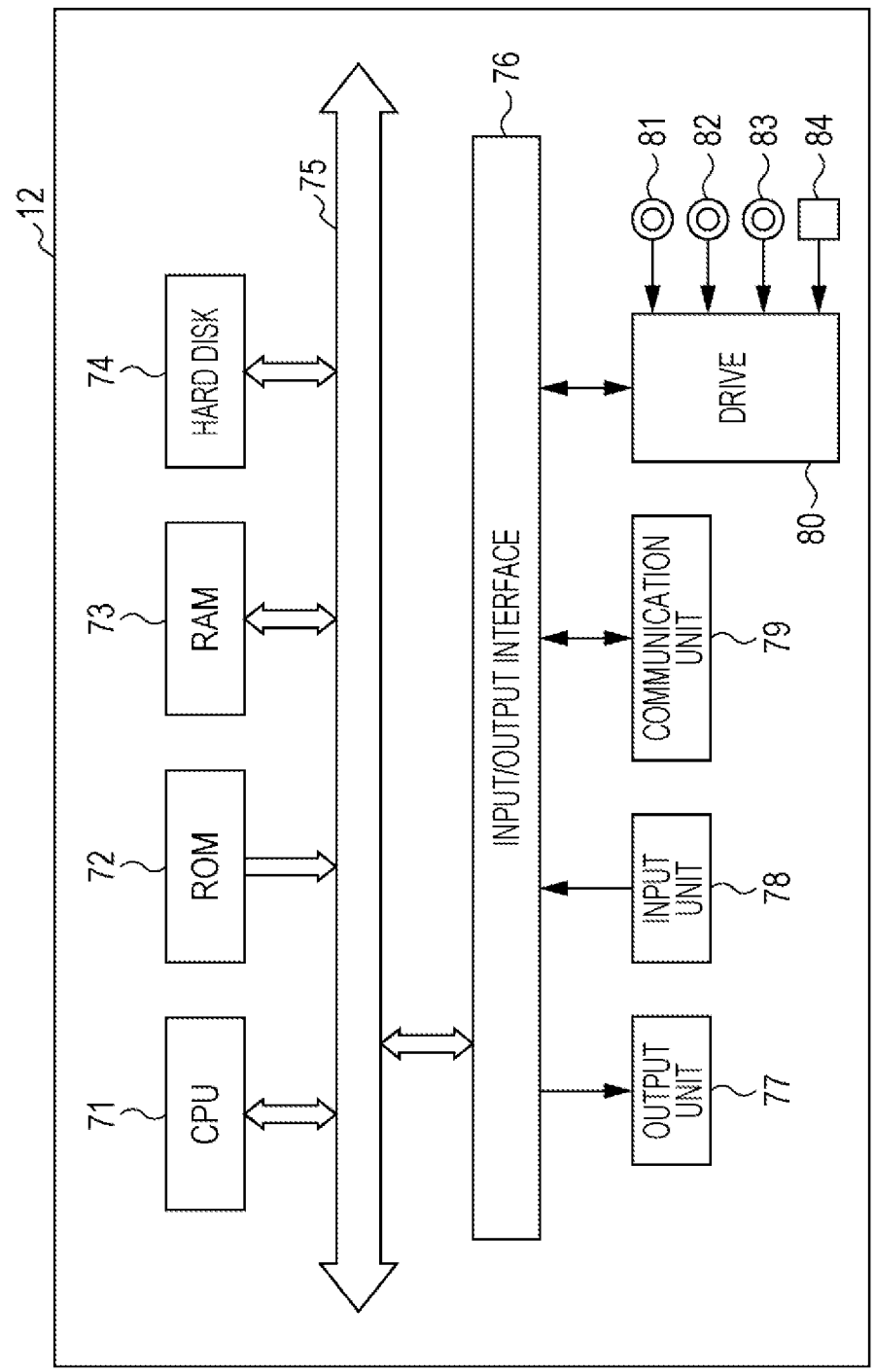
FIG. 3 is a block diagram illustrating a configuration of a management server illustrated in FIG. 1.

FIG. 3 is a block diagram illustrating a configuration of the management server 22 illustrated in FIG. 1.

In FIG. 3, an input/output interface 76 is connected to a CPU 71 through a bus 75.

When the user issues an instruction using an input unit 78 including a key board and a mouse through the input/output interface 76, for example, the CPU 71 loads a program stored in a recording medium such as a ROM 72, a hard disk 74, or a magnetic disk 81, an optical disc 82, a magneto-optical disc 83, or a semiconductor memory 84 which is inserted into a drive 80 into a RAM 73 and executes the program.

Furthermore, the CPU 71 outputs a result of the processing to an output unit 77 including an LCD through the input/output interface 76, for example. A communication unit 79 is connected to the network 20 and performs a predetermined communication process.

Figures 4, 5:
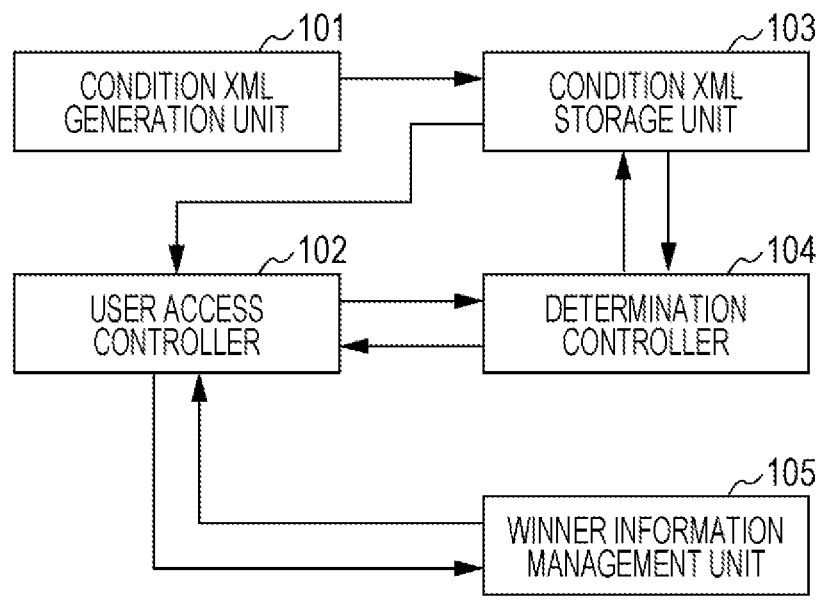
FIG. 4 is a block diagram illustrating a functional configuration of software such as programs to be executed by a CPU of a management server.
FIG. 5 is a diagram illustrating information input to the management server for a generation of a condition XML.

FIG. 4 is a block diagram illustrating a functional configuration of software such as programs executed by the CPU 71 of the management server 22 illustrated in FIG. 3.

A condition XML generation unit 101 generates an XML file including information on application requirements of the campaign and information on winning conditions and stores the XML file in the management server 22. For example, the XML file is automatically generated by inputting predetermined information to the management server 22.

FIG. 5 is a diagram illustrating information input to the management server 22 to generate the condition XML. In the example of FIG. 5, the information includes information on money, information on a period, information on an amount of money, information on a count, information of the number of winners, information on the number of winners per day, and information on the same user management.

In FIG. 5, "money" represents information specifying a type of electronic money for a campaign. In this case, "XX electronic money" is described.

In FIG. 5, "period" represents a period of time of the usage history of the electronic money which is to be referred to when it is determined whether the application requirements for the campaign are satisfied. In this example, it is determined whether the application requirements are satisfied in accordance with the usage history in a period of time from Aug. 15, 2012 (8/15/2012) to Sep. 14, 2012 (9/14/2012).

Note that, instead of "period" shown in FIG. 5, a period of time from a starting day of application of the campaign to an application deadline, that is, a campaign period, may be input, for example.

In FIG. 5, "amount" represents information specifying an amount of electronic money used for satisfying the application requirements of the campaign. In this example, "10000 yen or more" is described. Specifically, users who spend 10000 yen or more of the XX electronic money in the period of time from Aug. 15, 2012 to Sep. 14, 2012 satisfy the application requirements.

In FIG. 5, "count" represents information specifying the number of times the electronic money is used for satisfying the application requirements of the campaign. Although the information representing the number of times is not described in the example of FIG. 5, when the number of times is described, users who spend the XX electronic money the described number of times in the period of time from Aug. 15, 2012 to Sep. 14, 2012 satisfy the application requirements.

In FIG. 5, "the number of winners" represents information specifying the total number of winners in a drawing of the campaign. In this example, "3000 people" is described.

In FIG. 5, "the number of winners per day" represents information specifying the maximum number of winners per day in the campaign period. In this example, "100 people" is described. Note that it is assumed that the drawing is performed every day in the campaign period.

In FIG. 5, "the same user management" represents information determining whether management is performed such that applications in the second time onwards are rejected when the same user applies several times, for example. In this example, "on" is described.

The condition XML file is generated in accordance with the above-described information. However, the condition XML file transmitted to the mobile terminal 11 only includes information on "money", "period", "amount", and "count" shown in FIG. 5 but does not includes information on "the number of winners", "the number of winners per day", and "same user management".

Referring back to FIG. 4, the XML file generated by a condition XML generation unit 101 is stored in a condition XML storage unit 103.

A user access controller 102 controls access from the mobile terminal 11. When being accessed by the mobile terminal 11, for example, the user access controller 102 transmits the condition XML file stored in the condition XML storage unit 103 to the mobile terminal 11.

Note that the condition XML file may be transmitted all the mobile terminals 11 which access the management server 22. Alternatively, the condition XML file may be transmitted only to the mobile terminal 11 which has executed a dedicated application program for accessing the management server 22, for example, and which has transmitted a request of a predetermined format.

When receiving the condition XML file from the management server 22, the mobile terminal 11 executes a process corresponding to description content of the XML file.

In this case, the mobile terminal 11 determines whether the application requirements are satisfied with reference to the usage history of the electronic money, for example, and displays an image representing whether the application requirements are satisfied.

The user of the mobile terminal 11 which displays the image representing that the application requirements are satisfied performs an operation for applying the campaign where appropriate. By this, application data of the application which is associated with information representing the type of electronic money, an address of the mobile terminal 11, and an ID of the IC chip 54, for example, is stored in the management server 22. Alternatively, the application data may be associated with identification information for identifying the user of the mobile terminal 11.

A determination controller 104 determines whether the user who has applied the campaign is a winner of the drawing. The determination controller 104 obtains the condition XML file from the condition XML storage unit 103 and determines whether the user is a winner with reference to content of "the number of winner per day" and content of "same user management", for example.

The determination controller 104 determines whether the user is a winner in accordance with the application data by generating a random number, for example. The determination controller 104 supplies a result of the determination as to whether the user is a winner in accordance with the application data.

The user access controller 102 which receives the result of the winner determination transmits a URL for displaying a notification image representing that the user of the mobile terminal 11 is a winner or a notification image representing that the user is not a winner to the mobile terminal 11, for example.

Note that the notification image representing that the user is a winner includes a certain entry form and prompts the user of the mobile terminal 11 to fill out the entry form. When the user fills out the entry form, the content of the entry form is supplied to a winner information management unit 105 through the user access controller 102.

Note that, when the input of the entry form is completed, the mobile terminal 11 transmits an input completion notification.

The winner information management unit 105 generates and stores information on the user which is input content of the entry form as winner information. For example, information shown in FIG. 6 is the winner information, for example. In the example of FIG. 6, the winner information includes information on a date and time of winning, an IC chip ID, electronic money, and user input information.

In FIG. 6, "date and time of winning" represents information specifying a date and time when the user won the prize. In this example, "8/30/2012 (Aug. 30, 2012)" is described.

In FIG. 6, "IC chip ID" represents information specifying the ID of the IC chip 54 incorporated in the mobile terminal 11.

In FIG. 6, "electronic money" represents information specifying a type of electronic money for the campaign. In this case, "XX electronic money" is described.

In FIG. 6, "user input information" represents information based on the content filled by the user in the entry form. In this example, an e-mail address (zzz@qqq.ne.jp) is described. Note that information may be added to "user input information" shown in FIG. 6 in accordance with the input content of the entry form. In a case where fields for an e-mail address, a gender, an occupation, and an age are provided, for example, information on the e-mail address, the gender, the occupation, and the age is also described in "user input information shown in FIG. 6.

The winner information management unit 105 transmits the winner information, for example, to the electronic money server 23 where appropriate. For example, when "XX electronic money" is described in the field of "electronic money" shown in FIG. 6, the winner information is transmitted to the electronic money server 23-1 whereas when "YY electronic money" is described in the field of "electronic money" shown in FIG. 6, the winner information is transmitted to the electronic money server 23-2.

By this, the electronic money companies recognize attributes of the user (a gender, an occupation, an age, and the like) so as to utilize the attributes of the user for marketing. Furthermore, it is more effective when information is additionally obtained by means of questionnaire in the entry form where appropriate.

Furthermore, the winner information management unit 105 transmits an e-mail including information on reception of the prize to the user through the user access controller 102. Note that the e-mail address of a transmission destination is the same as the e-mail address written in the entry form. FIG. 7 is a diagram illustrating the information included in the e-mail described above.

In FIG. 7, "prize" represents information specifying the prize received as a result of the drawing. In this example, "XX electronic money 500 yen" is described.

In FIG. 7, "how to receive" represents information specifying a procedure of reception of the prize. In this example, a certain URL is described. The certain URL corresponds to a URL of the electronic money server 23-1. Specifically, the user may obtain XX electronic money of 500 yen by accessing the described URL.

In FIG. 7, "inquiry" represents information specifying an organization or the like which accepts inquiries about the reception of the prize. For example, an address and a telephone number of the organization are described.

In FIG. 7, "note" represents an instruction about the reception of the prize. In this example, "receive the prize within a month from today" is described.

When receiving the e-mail including the information shown in FIG. 7, the user of the mobile terminal 11 receives the prize by accessing the URL described as the reception procedure, for example.

Figure 8:
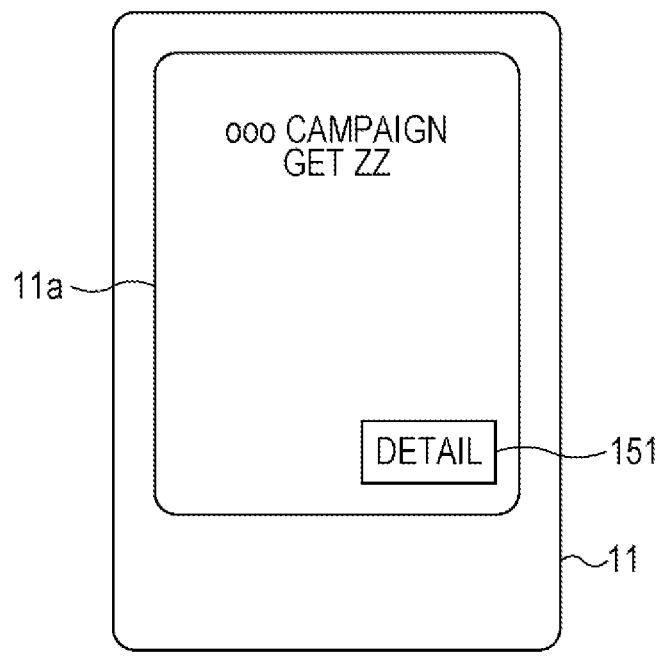
FIG. 8 is a diagram illustrating an image displayed in the mobile terminal.

FIG. 8 is a diagram illustrating an image displayed in a display 11a of the mobile terminal 11 which has accessed the service provision server 21. In this example, a name of the campaign and information on the prize are displayed in the display 11a of the mobile terminal 11.

In this state, when a button 151 displayed in the display 11a is pressed, a URL of the management server 22 is automatically input and the mobile terminal 11 accesses the management server 22, for example.

As described above, when being accessed by the mobile terminal 11, the user access controller 102 of the management server 22 transmits the condition XML file stored in the condition XML storage unit 103 to the mobile terminal 11. The mobile terminal 11 receives the condition XML file and executes a process corresponding to description content of the condition XML file.

Specifically, the mobile terminal 11 determines whether the application requirements are satisfied with reference to the usage history of the electronic money in accordance with the description content of the condition XML file and displays an image representing whether the application requirements are satisfied. For example, when the mobile terminal 11 receives the condition XML file generated in accordance with the information shown in FIG. 5 and when it is determined that the XX electronic money of 10000 yen or more is spent in the period of time from Aug. 15, 2012 to Sep. 14, 2012 with reference to the usage history, it is determined that the user of the mobile terminal 11 satisfies the application requirements.

Figure 9:
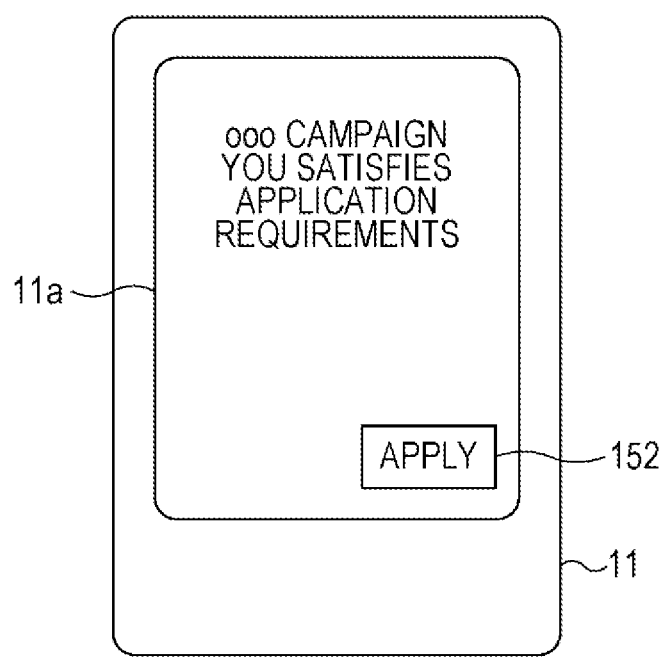
FIG. 9 is a diagram illustrating another image displayed in the mobile terminal.

FIG. 9 is a diagram illustrating another image displayed in the display 11a of the mobile terminal 11 which has accessed the management server 22. In this example, an image displayed when it is determined that the user of the mobile terminal 11 satisfies the application requirements is shown. The name of the campaign and information representing that the user satisfies the application requirements are displayed in the display 11a of the mobile terminal 11.

Figure 10:
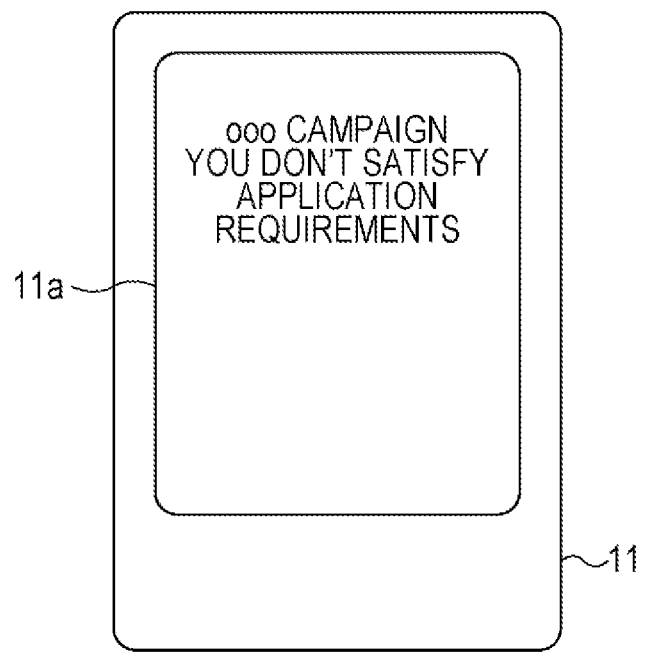
FIG. 10 is a diagram illustrating still another image displayed in the mobile terminal.

FIG. 10 is a diagram illustrating still another image displayed in the display 11a of the mobile terminal 11 which has accessed the management server 22. In this example, an image displayed when it is determined that the user of the mobile terminal 11 does not satisfy the application requirements is shown. The name of the campaign and information representing that the user does not satisfy the application requirements are displayed in the display 11a of the mobile terminal 11.

As described above, according to the present technique, the determination as to whether the application requirements are satisfied is made by the mobile terminal 11 in accordance with the condition XML file. Accordingly, users who satisfy the campaign conditions may be easily selected from among owners of the mobile terminals 11, for example. Furthermore, there is not necessity to assign the application qualification to all the owners of the mobile terminal 11, for example.

Furthermore, since the mobile terminal 11 determines whether the application requirements are satisfied with reference to the usage history of the electronic money, a campaign which promotes use of the electronic money in a medium- and long-term may be organized when compared with a case where an incentive such as a point is given every time a product or a service is purchased. Furthermore, a POS system installed in a store or the like is not requested to be operated together.

For example, a button 152 displayed in the display 11a of the mobile terminal 11 shown in FIG. 9 is pressed, data including the address of the mobile terminal 11 and the ID of the IC chip 54 is transmitted as application data and the application data is stored in the management server 22.

Thereafter, the management server 22 performs a drawing, determines winners, and transmits a URL for displaying the image representing that the user is a winner or the image representing that the user is not a winner to the mobile terminal 11. When the mobile terminal 11 accesses the URL, the image representing that the user is a winner or the image representing that the user is not a winner is displayed in the mobile terminal 11.

Figure 11:
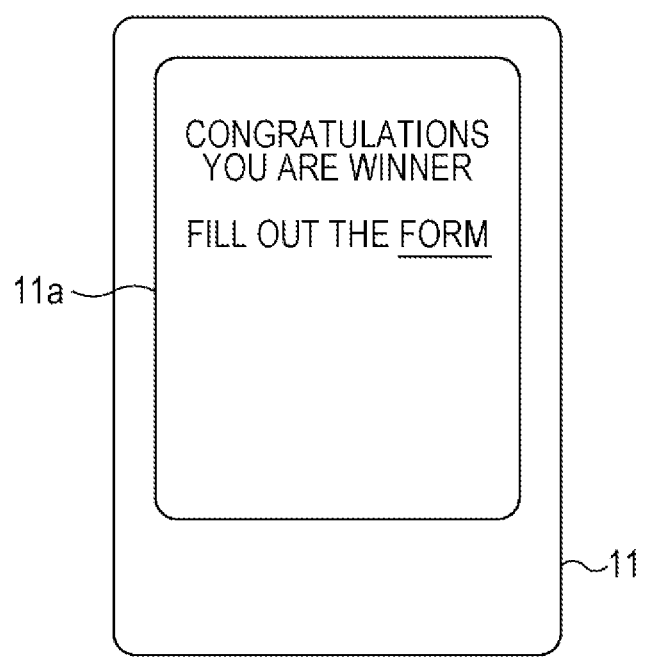
FIG. 11 is a diagram illustrating a further image displayed in the mobile terminal.

FIG. 11 is a diagram illustrating the image representing that the user is a winner. In this example, text representing that the user is a winner is displayed in the display 11a of the mobile terminal 11, and furthermore, text which prompts the user to fill out an entry form is displayed. Here, when text "form" displayed in the display 11a of the mobile terminal 11 is pressed, the entry form is displayed in the mobile terminal 11.

Figure 12:
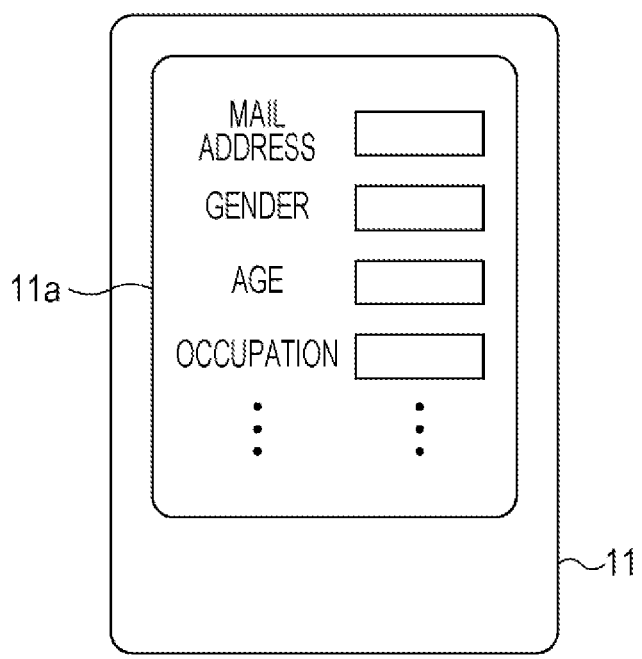
FIG. 12 is a diagram illustrating a still further image displayed in the mobile terminal.

FIG. 12 is a diagram illustrating the entry form displayed in the mobile terminal 11. The user is prompted to input an e-mail address, a gender, an age, an occupation, and the like in the entry form displayed in the display 11a of the mobile terminal 11 shown in FIG. 12.

Note that content input to the entry form shown in the image of FIG. 12 is stored as the user input information included in the winner information described with reference to FIG. 6.

As described above, in the present technique, only users who are winner are requested to disclose personal information. For example, in a case where all users are prompted to perform user registration in advance so as to disclose personal information of the users, the users may hesitate to disclose the personal information, and therefore, the users may withhold the participation in the campaign. According to the present technique, the users participate in the campaign without hesitation.

Note that the images shown in FIGS. 8 to 12 are merely examples of images displayed in the display 11a of the mobile terminal 11. Furthermore, the button 151 shown in FIG. 8, the button 152 shown in FIG. 9, and the text in the form shown in FIG. 11 are examples of GUIs and operations may be performed using other interfaces (such as sound and actions).

Figure 13:
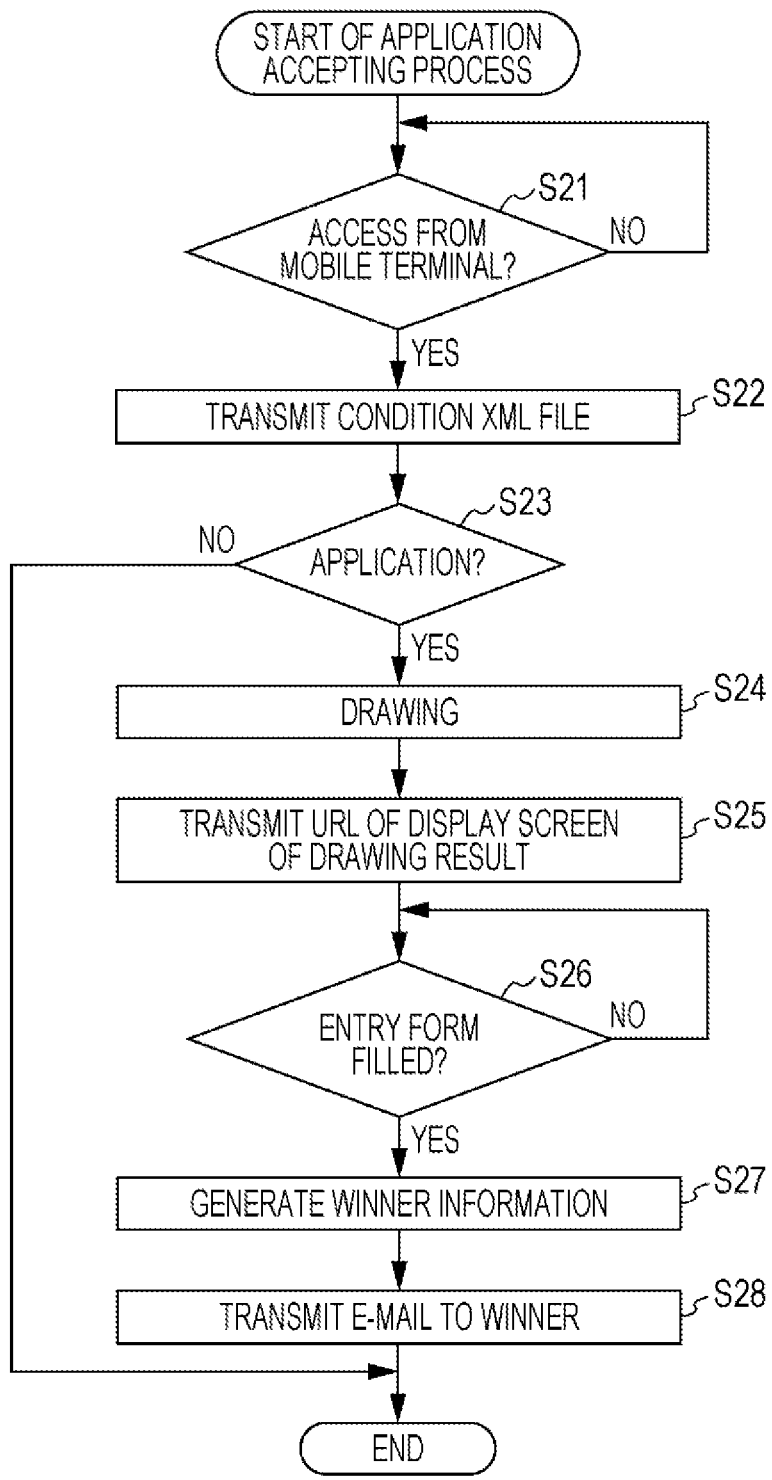
FIG. 13 is a flowchart illustrating an application accepting process.

FIG. 13 is a flowchart illustrating an application accepting process performed by the management server 22.

In step S21, the user access controller 102 of the management server 22 determines whether the mobile terminal 11 has accessed the management server 22 and waits until the determination becomes affirmative.

When the determination is affirmative in step S21, the process proceeds to step S22.

In step S22, the user access controller 102 transmits the condition XML file stored in the condition XML storage unit 103 to the mobile terminal 11. Then the mobile terminal 11 determines whether the user satisfies the application requirements of the campaign.

In step S23, the user access controller 102 determines whether an application is received from the mobile terminal 11. When the determination is affirmative in step S23, the process proceeds to step S24.

In step S24, the determination controller 104 performs a drawing and determines whether the user who applies the campaign is a winner. Here, the determination controller 104 obtains the condition XML file from the condition XML storage unit 103 and determines whether the user is a winner with reference to content of "the number of winner per day" and content of "same user management", for example.

In step S25, the user access controller 102 transmits a URL for displaying a notification image representing that the user of the mobile terminal 11 is a winner or a notification image representing that the user is not a winner to the mobile terminal 11.

In step S26, the user access controller 102 determines whether the entry form has been filled and waits until the determination becomes affirmative.

When the determination is affirmative in step S26, the process proceeds to step S27. Note that description content of the entry form is supplied to the winner information management unit 105 through the user access controller 102.

In step S27, the winner information management unit 105 generates winner information. In this case, the winner information management unit 105 generates winner information including the information shown in FIG. 6, for example.

In step S28, the winner information management unit 105 transmits an e-mail including information on reception of the prize to the user through the user access controller 102. In this case, an e-mail including the information shown in FIG. 7 is transmitted, for example. Note that the e-mail address of a transmission destination is the same as the e-mail address written in the entry form.

On the other hand, when the determination is negative in step S23, a process from step S24 to step S28 is skipped.

In this way, the application accepting process is performed.

Figure 14:
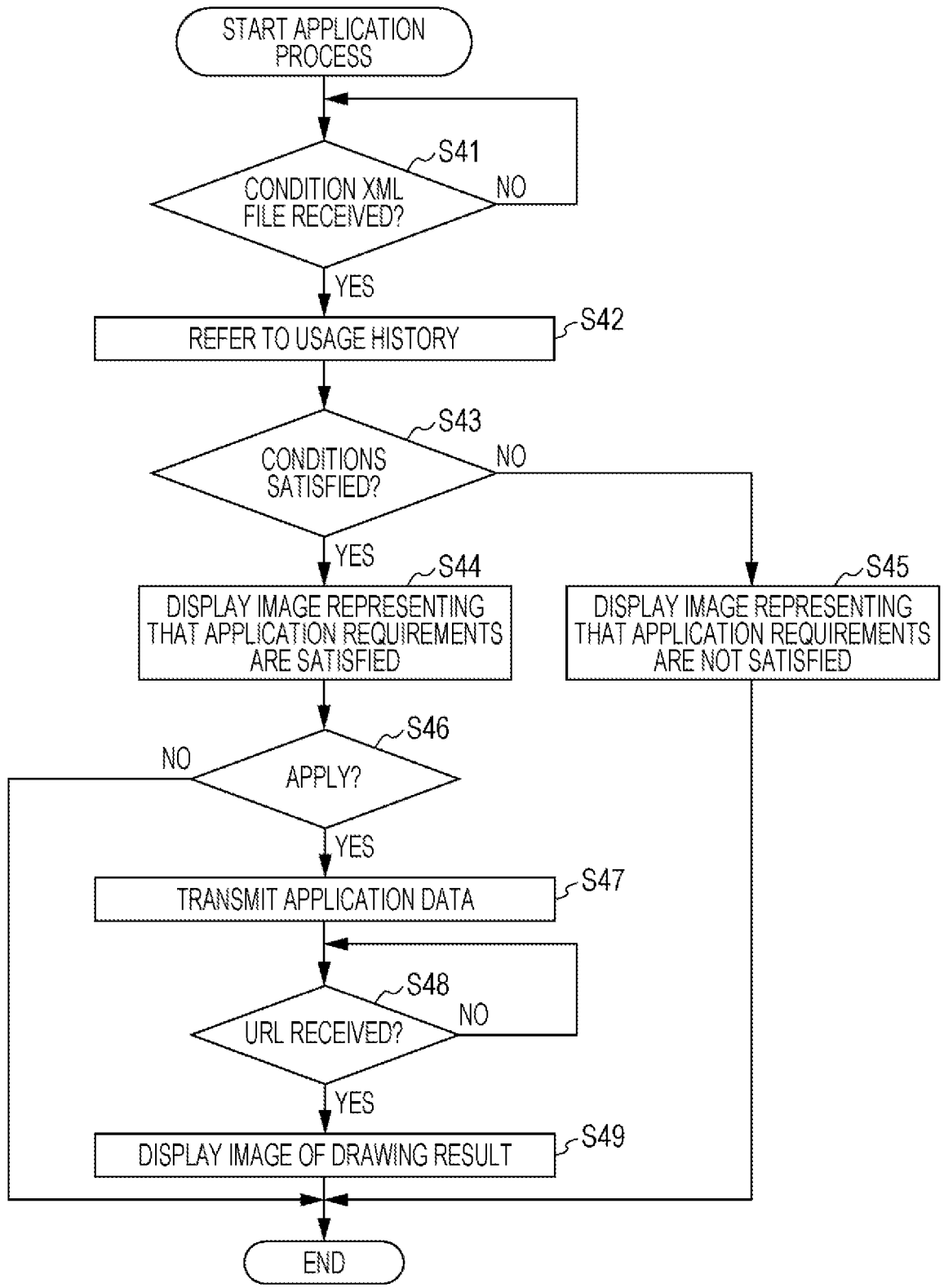
FIG. 14 is a flowchart illustrating an application process.

FIG. 14 is a flowchart illustrating an application process performed by the mobile terminal 11. This process is performed when the mobile terminal 11 accesses the service provision server 21 so as to purchase a product or a service using the electronic money, for example. Furthermore, it is assumed that, before this process is performed, the image shown in FIG. 8 is displayed in the display 11a of the mobile terminal 11 and the user presses the button 151.

In step S41, the mobile terminal 11 determines whether the condition XML file has been received and waits until the determination becomes affirmative.

When the condition XML file transmitted from the management server 22 in the process of step S22 shown in FIG. 13 has been received, it is determined that the condition XML file has been received in step S41. When the determination is affirmative in step S41, the process proceeds to step S42.

In step S42, the mobile terminal 11 performs a process in accordance with the description content of the XML file received in the process in step S41. Here, the mobile terminal 11 refers to the usage history of the electronic money so as to determine whether the user satisfies the application requirements.

In step S43, the mobile terminal 11 determines whether conditions included in the condition XML file are satisfied in accordance with the usage history of the electronic money referred to in step S42. For example, when the mobile terminal 11 receives the condition XML file generated in accordance with the information shown in FIG. 5 and when it is determined that the XX electronic money of 10000 yen or more is spent in the period of time from Aug. 15, 2012 to Sep. 14, 2012 with reference to the usage history, it is determined that the user of the mobile terminal 11 satisfies the application requirements.

When the determination is affirmative in step S43, the process proceeds to step S44.

In step S44, the mobile terminal 11 displays an image representing that the user satisfies the application requirements. Here, the image shown in FIG. 9 is displayed in the display 11a of the mobile terminal 11, for example.

In step S46, the mobile terminal 11 determines whether the user participates in the campaign. When the button 152 included in the image shown in FIG. 9 is pressed, it is determined that the user participates in the campaign in step S46.

In step S47, the mobile terminal 11 transmits application data. Here, data including information representing the type of electronic money, the address of the mobile terminal 11, and the ID of the IC chip 54 is transmitted as the application data and the application data is stored in the management server 22. Alternatively, identification information for identifying the user of the mobile terminal 11 may be included in the application data.

In this way, the management server 22 performs the drawing in the process of step S24 shown in FIG. 13 and the URL of the image displaying a result of the drawing is transmitted by the process in step S25 in FIG. 13.

In step S48, the mobile terminal 11 determines whether the URL of the image displaying the result of the drawing which is transmitted from the management server 22 has been received and waits until the determination becomes affirmative.

When the determination is affirmative in step S48, the process proceeds to step S49.

In step S49, the mobile terminal 11 displays the image representing the result of the drawing. By this, the image representing that the user is a winner or the image representing that the user is not a winner is displayed in the mobile terminal 11.

When the result of the drawing represents that the user is a winner, the image shown in FIG. 11 is displayed in the display 11a of the mobile terminal 11, for example. Here, when the text "form" displayed in the display 11a of the mobile terminal 11 is pressed, the entry form is displayed in the mobile terminal 11. When the user fills out the entry form, the mobile terminal 11 transmits an input completion notification and it is determined that the entry form has been filled in step S26 of FIG. 13. Thereafter, the process proceeds to step S27 and step S28.

On the other hand, when the determination is negative in step S46, a process from step S47 to step S49 is skipped.

Furthermore, when the determination is negative in step S43, the process proceeds to step S45. In this case, the image shown in FIG. 10 is displayed in the display 11a of the mobile terminal 11, for example, and the process is terminated.

In this way, the application process is performed.

Although the example of the campaign organized in response to the request from the company A which provides the XX electronic money has been described hereinabove, the present technique enables a plurality of electronic money companies to organize a campaign in cooperation. For example, the XX electronic money and the YY electronic money are set as electronic money for a campaign (for example, "money" shown in FIG. 5), and the companies A and B may organize the campaign together.

Furthermore, although the case where the management server 22 is managed by an event planning company has been described in the foregoing description, the management server 22 may be managed by an electronic money company.

Moreover, although the case where the user purchases a product or a service using the electronic money by means of the mobile terminal 11 has been described hereinabove, the present technique may be applicable even in a case where the user purchases a product or a service using the electronic money by means of a personal computer. The point is that the user executes a process corresponding to description content of the condition XML file by an electronic apparatus.

Furthermore, although the case where the condition XML file is obtained from the management server 22 through the communication using the network 20 has been described hereinabove, the condition XML file may be obtained in a different way.

For example, the condition XML file may be obtained by capturing a 2D barcode such as a QR code by a camera incorporated in a user terminal and analyzing the 2D barcode or may be obtained by receiving as an attached file of an e-mail.

Alternatively, the condition XML file may be obtained using a poster including an IC tag embedded therein and a smart poster generated by an NFC (Near Filed Communication) technique.

Note that the series of processes described above may be executed by hardware or software. When the series of processes described above is executed by software, programs of the software are installed in a computer incorporated in dedicated hardware or a general personal computer 700 shown in FIG. 15, for example, which is capable of executing various functions by installing various programs through a network or a recording medium.

Figure 15:
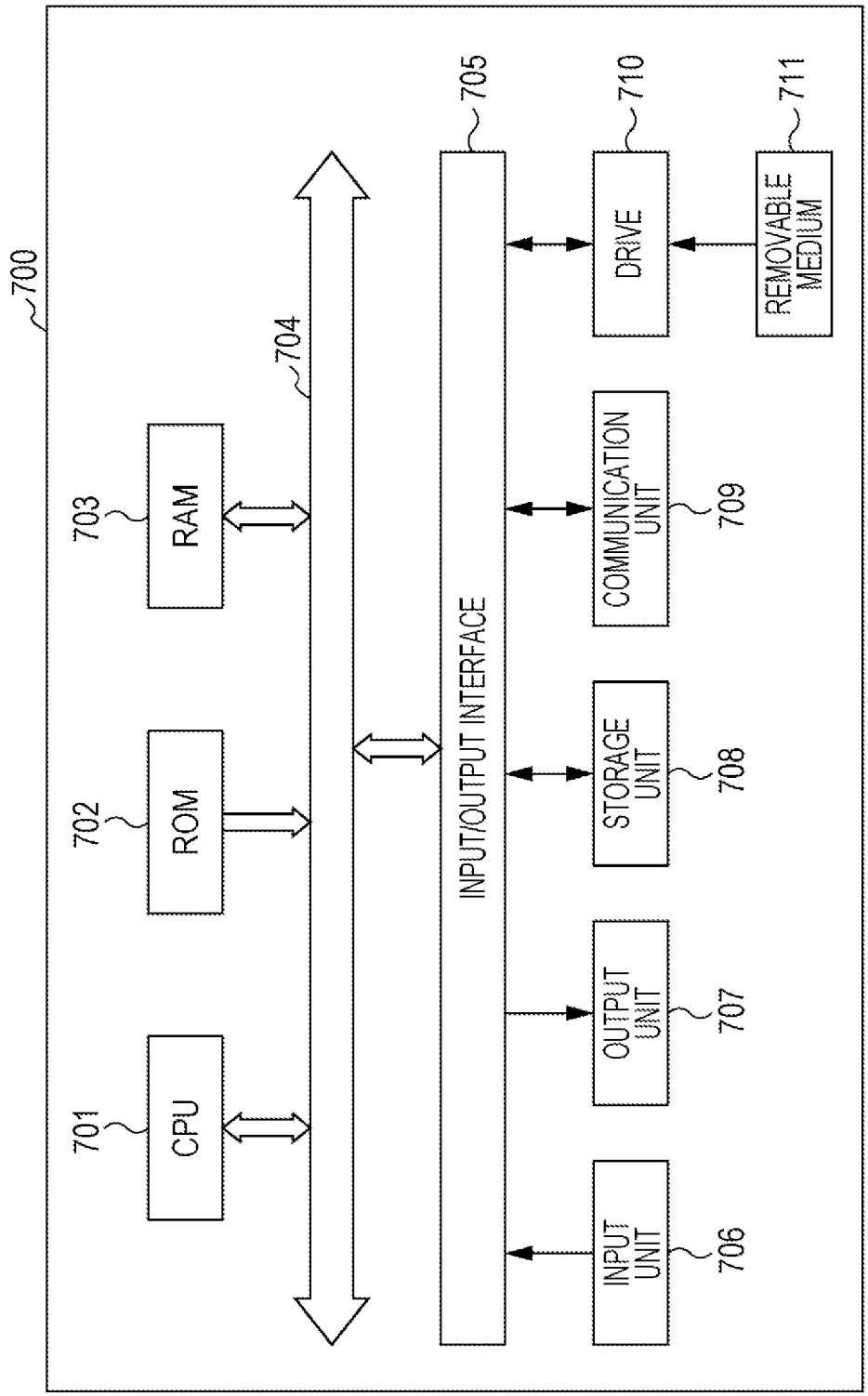
FIG. 15 is a block diagram illustrating a configuration of a personal computer.

In FIG. 15, a CPU 701 performs various processes in accordance with programs stored in a ROM 702 or programs loaded from a storage unit 708 into a RAM 703. The RAM 703 also stores data used by the CPU 701 for execution of the various processes where appropriate.

The CPU 701, the ROM 702, and the RAM 703 are connected to one another through a bus 704. To the bus 704, an input/output interface 705 is also connected.

To the input/output interface 705, an input unit 706 including a keyboard and a mouse, an output unit 707 including a display such as an LCD and a speaker, the storage unit 708 such as a hard disk, and a communication unit 709 including a modem and a network interface card such as a LAN card are connected. The communication unit 709 performs a communication process through a network including the Internet.

To the input/output interface 705, a drive 710 is also connected where appropriate. A removable medium 711 such as a magnetic disk, an optical disc, a magneto-optical disc, or a semiconductor memory is inserted into the drive 710 where appropriate, and computer programs read from the removable medium 711 are installed in the storage unit 708 where appropriate.

When the series of processes described above is executed by software, programs included in the software are installed from a network such as the Internet or a recording medium such as the removable medium 711.

Note that the recording medium includes not only the removable medium 711 such as a magnetic disk (including a floppy disk (registered trademark)), an optical disc (including a CD-ROM (Compact Disc-Read Only Memory), and a DVD (Digital Versatile Disk)), a magneto-optical disc (including MD (Mini-Disk) (registered trademark)), or a semiconductor memory which records the programs therein and which is distributed to deliver the programs to users independently from an apparatus body but also the ROM 702 recording the programs therein and a hard disk included in the storage unit 708 which is distributed to users in a state in which the ROM 702 or the hard disk is incorporated in the apparatus body.

Note that the series of processes described above in this specification may be performed in order of description in a time-series manner, may be performed in parallel, or may be individually performed.

Furthermore, embodiments of the present technique are not limited to the foregoing embodiment and various modifications may be made without departing from the scope of the present technique.

Note that the present technique may be configured as below.

An information processing apparatus including a condition data obtaining unit configured to obtain condition data representing conditions of use of electronic money in a predetermined period of time from an information management apparatus which accepts access from a plurality of information processing apparatuses connected through a network, a condition determination unit configured to determine whether the conditions are satisfied in accordance with usage history of the electronic money stored in advance and the condition data, and a transmission unit configured to transmit, when the condition determination unit determines that the conditions are satisfied, application data including identification information for identifying an applicant to the information management apparatus.

(2) The information processing apparatus according to (1) further including a display unit configured to display a result of the determination made by the condition determination unit.

(3) The information processing apparatus according to (1) or (2) which accesses the information management apparatus in accordance with information obtained by accessing a service provision apparatus which is connected through the network and which provides products or services to be purchased using the electronic money for the information processing apparatus.

(4) The information processing apparatus according to any one of (1) to (3) further including a display unit configured to display a result of a drawing performed by the information management apparatus when the condition determination unit determines that the conditions are satisfied.

(5) The information processing apparatus according to any one of (1) to (4) further including a display unit configured to display an image which prompts a user to fill out an predetermined entry form when the condition determination unit determines that the conditions are satisfied.

(6) The information processing apparatus according to (5), wherein winner information generated in accordance with a result of the input to the entry form is stored in the information management apparatus.

(7) An information processing method including obtaining condition data representing conditions of use of electronic money in a predetermined period of time from an information management apparatus which accepts access from a plurality of information processing apparatuses connected through a network, determining whether the conditions are satisfied in accordance with usage history of the electronic money stored in advance and the condition data, and transmitting, when the condition determination unit determines that the conditions are satisfied, application data including identification information for identifying an applicant to the information management apparatus.

(8) A recording medium which records a program causing a computer to function as an information processing apparatus, the information processing apparatus including a condition data obtaining unit configured to obtain condition data representing conditions of use of electronic money in a predetermined period of time from an information management apparatus which accepts access from a plurality of information processing apparatuses connected through a network, a condition determination unit configured to determine whether the conditions are satisfied in accordance with usage history of the electronic money stored in advance and the condition data, and a transmission unit configured to transmit, when the condition determination unit determines that the conditions are satisfied, application data including identification information for identifying an applicant to the information management apparatus.

(9) An information management apparatus including a condition data storage unit configured to store condition data representing conditions of use of electronic money in a predetermined period of time, a condition data transmission unit configured to transmit the condition data to a plurality of user terminals which access the information management apparatus through a network, and an application data reception unit configured to receive application data which includes identification information for identifying an applicant and which is transmitted from a user terminal, among the plurality of user terminals, which is determined to satisfy the conditions represented by the condition data.

(10) The information management apparatus according to (9) which accessed by the plurality of user terminals in accordance with information obtained when the user terminals access a service provision apparatus which is connected to the user terminals through the network and which provides products or services to be purchased using the electronic money for the user terminals.

(11) The information management apparatus according to (9) or (10) further including a drawing execution unit configured to perform a drawing to select a predetermined number of application data as application data of winners from among application data received by the application data reception unit in accordance with the condition data which further includes a condition associated with the number of winners.

(12) The information management apparatus according to (11) further including a drawing result transmission unit configured to transmit information used to display a result of the drawing to the user terminals.

(13) The information management apparatus according to (11), wherein the drawing result transmission unit further transmits information used to display an image which prompts a user to fill out a predetermined entry form to the winners.

(14) The information management apparatus according to (13) further including a winner information storage unit configured to store winner information generated in accordance with a result of input to the entry form.

(15) The information management apparatus according to (14) further including an e-mail transmission unit configured to transmit e-mails including information on reception of a prize to the winners in accordance with the winner information.

(16) An information management method including
transmitting condition data representing conditions of use of electronic money in a predetermined period of time to a plurality of user terminals which perform accesses through a network, and receiving application data which includes identification information for identifying an applicant and which is transmitted from a user terminal, among the plurality of user terminals, which is determined to satisfy the conditions represented by the condition data.

(17) A recording medium which records a program causing a computer to function as an information management apparatus, the information management apparatus including a condition data storage unit configured to store condition data representing conditions of use of electronic money in a predetermined period of time, a condition data transmission unit configured to transmit the condition data to a plurality of user terminals which access the information management apparatus through a network, and an application data reception unit configured to receive application data which includes identification information for identifying an applicant and which is transmitted from a user terminal, among the plurality of user terminals, which is determined to satisfy the conditions represented by the condition data.

(18) An information processing system including an information management apparatus and a user terminal, the information management apparatus including a condition data storage unit configured to store condition data representing conditions of use of electronic money in a predetermined period of time, a condition data transmission unit configured to transmit the condition data to a plurality of user terminals which access the information management apparatus through a network, and an application data reception unit configured to receive application data which includes identification information for identifying an applicant and which is transmitted from a user terminal, among the plurality of user terminals, which is determined to satisfy the conditions represented by the condition data, and the user terminal including a condition data obtaining unit configured to obtain the condition data representing conditions of use of electronic money in a predetermined period of time from the information management apparatus, a condition determination unit configured to determine whether the conditions are satisfied in accordance with usage history of the electronic money stored in advance and the condition data, and a transmission unit configured to transmit, when the condition determination unit determines that the conditions are satisfied, application data including identification information for identifying an applicant to the information management apparatus.

(19) An information processing apparatus including a communication unit, a memory, and a controller, wherein the controller externally obtains condition information representing conditions of use of electronic money in a predetermined period of time, determines whether usage history of the electronic money stored in the memory in advance satisfies the conditions in accordance with the condition information, and transmits notification data including identification information of the electronic money through the communication unit when it is determined that the conditions are satisfied.

(20) An information processing method including externally obtaining condition information representing conditions of use of electronic money in a predetermined period of time by an information processing apparatus, determining whether the conditions are satisfied in accordance with usage history of the electronic money stored in advance and the condition information, and transmitting, when it is determined that the conditions are satisfied, notification data including identification information to an information management apparatus.

(21) A recording medium which records a program causing a computer to function as an information processing apparatus which transmits notification data including identification information through a communication unit when a determination as to whether conditions are satisfied is affirmative in accordance with condition information representing the conditions of use of electronic money in a predetermined period of time which is externally obtained and usage history of the electronic money stored in a memory in advance.

(22) An information management apparatus including a communication unit, a memory, and a controller, wherein the controller stores condition information representing conditions of use of electronic money of a user terminal in a predetermined period of time in the memory, transmits the condition information to the user terminal through the communication unit, and receives notification data including identification information which is transmitted from the user terminal which is determined that usage history of electronic money of the user terminal satisfies the conditions through the communication unit.

(23) An information management method including transmitting condition information representing conditions of use of electronic money in a predetermined period of time to user terminals which perform accesses through a network, and receiving notification data which includes identification information transmitted from a user terminal, among the user terminals, which is determined that usage history of electronic money of the user terminal satisfies the conditions.

(24) A recording medium which records a program causing a computer to function as an information management apparatus which stores condition information representing conditions of use of electronic money of a user terminal in a predetermined period of time in the memory, transmits the condition information to the user terminal through a communication unit, and receives notification data including identification information which is transmitted from the user terminal which is determined that usage history of electronic money of the user terminal satisfies the conditions through the communication unit.

(25) An information processing system including a user terminal and an information management apparatus, the user terminal including a first communication unit, a first memory, and a first controller, and the information management apparatus including a second communication unit, a second memory, and a second controller, wherein the second memory stores condition information representing conditions of use of electronic money of a user terminal in a predetermined period of time, the first controller externally obtains the condition information representing conditions of use of electronic money in a predetermined period of time, determines whether usage history of the electronic money stored in the first memory in advance satisfies the conditions in accordance with the condition information, and transmits notification data including identification information through the first communication unit when it is determined that the conditions are satisfied, and the second controller receives the notification data transmitted from the user terminal which is determined that the usage history of electronic money of the user terminal satisfies the conditions.

What is claimed is:

1. A mobile terminal configured for use in a system having an information management apparatus and implementing a reward campaign for a user of the mobile terminal, said mobile terminal comprising:

an IC (integrated circuit) chip having unique identification information which uniquely identifies the IC chip of the mobile terminal from other IC chips of other mobile terminals;

a memory configured to have a program stored therein;

a communication unit connected to an input/output interface and configured to wirelessly receive condition data in the form of an electronic markup language file representing a number of predetermined conditions needed to be satisfied within a predetermined period of time from the information management apparatus which accepts access from a plurality of mobile terminals connected by way of a communication network; and a CPU (Central Processing Unit) configured to execute the program from the memory and upon execution thereof to (i) perform a first determination, by performing a process according to the electronic markup language file, as to whether the number of predetermined conditions are satisfied in accordance with usage history of electronic money, the usage history being stored in advance in the mobile terminal, such that the first determination is performable in the mobile terminal, (ii) cause an indication of a result of the first determination to be provided to a user of the mobile terminal and, when the result of the first determination indicates that the number of predetermined conditions are satisfied, cause display of an image on a display of the mobile terminal, wherein the image comprises the name of the reward campaign, information representing that the number of predetermined conditions is satisfied, and a selectable button, which when selected causes application data including address information of the mobile terminal and the unique identification information of the IC chip to be wirelessly transmitted by way of the communication network for receipt by the information management apparatus, (iii) after wirelessly transmitting the application data, perform a second determination as to whether a response has been received from the information management apparatus, in which the response pertains to a determination performed by the information management apparatus as to whether the number of predetermined conditions are satisfied, and (iv) when a result of the second determination indicates that the response has been received, cause display of a second image on the display of the mobile terminal, wherein the second image comprises information representing that the user is a winner of the reward campaign, and a selectable input, which when selected requests user information pertaining to the user to be wirelessly transmitted for receipt by the information management apparatus such that a respective user who is not provided with the second selectable input is not requested to wirelessly transmit the user information pertaining to the respective user.

2. The mobile terminal according to claim 1, in which the mobile terminal is configured as a smart phone.

3. The mobile terminal according to claim 1, in which the mobile terminal is configured as a tablet terminal.

4. An information processing method for use with a mobile terminal having an IC (integrated circuit) chip having unique identification information which uniquely identifies the IC chip of the mobile terminal from other IC chips of other mobile terminals, a memory, a communication unit connected to an input/output interface, and a CPU (Central Processing Unit), said mobile terminal configured for use in a system having an information management apparatus and implementing a reward campaign for a user of the mobile terminal, said method comprising:

wirelessly receiving, by use of the communication unit, condition data in the form of an electronic markup language file representing a number of predetermined conditions needed to be satisfied within a predetermined period of time from the information management apparatus which accepts access from a plurality of mobile terminals connected by way of a communication network; and executing, by use of the CPU, a program obtained from the memory and upon execution thereof (i) performing a first determination, by performing a process according to the electronic markup language file, as to whether the number of predetermined conditions are satisfied in accordance with usage history of electronic money, the usage history being stored in advance in the mobile terminal, such that the first determination is performable in the mobile terminal, (ii) causing an indication of a result of the first determination to be provided to a user of the mobile terminal and, when the result of the first determination indicates that the number of predetermined conditions are satisfied, causing display of an image on a display of the mobile terminal, wherein the image comprises the name of the reward campaign, information representing that the number of predetermined conditions is satisfied, and a selectable button, which when selected causes application data including address information of the mobile terminal and the unique identification information of the IC chip to be wirelessly transmitted by way of the communication network for receipt by the information management apparatus, (iii) after wirelessly transmitting the application data, performing a second determination as to whether a response has been received from the information management apparatus, in which the response pertains to a determination performed by the information management apparatus as to whether the number of predetermined conditions are satisfied, and (iv) when a result of the second determination indicates that the response has been received, causing display of a second image on the display of the mobile terminal, wherein the second image comprises information representing that the user is a winner of the reward campaign, and a selectable input, which when selected requests user information pertaining to the user to be wirelessly transmitted for receipt by the information management apparatus such that a respective user who is not provided with the second selectable input is not requested to wirelessly transmit the user information pertaining to the respective user.

5. A non-transitory computer readable recording medium having recorded thereon a program for use in a mobile terminal configured for use in a system having an information management apparatus and implementing a reward campaign for a user of the mobile terminal, said mobile terminal having an IC (integrated circuit) chip having unique identification information which uniquely identifies the IC chip of the mobile terminal from other IC chips of other mobile terminals, a memory, a communication unit connected to an input/output interface, and a CPU (Central Processing Unit), said program when executed causes the mobile terminal to perform a method comprising:

wirelessly receiving, by use of the communication unit, condition data in the form of an electronic markup language file representing a number of predetermined conditions needed to be satisfied within a predetermined period of time from the information management apparatus which accepts access from a plurality of mobile terminals connected by way of a communication network; and using the CPU to (i) perform a first determination, by performing a process according to the electronic markup language file, as to whether the number of predetermined conditions are satisfied in accordance with usage history of electronic money, the usage history being stored in advance in the mobile terminal, such that the first determination is performable in the mobile terminal, (ii) cause an indication of a result of the first determination to be provided to a user of the mobile terminal and, when the result of the first determination indicates that the number of predetermined conditions are satisfied, to cause display of an image on a display of the mobile terminal, wherein the image comprises the name of the reward campaign, information representing that the number of predetermined conditions is satisfied, and a selectable button, which when selected causes application data including address information of the mobile terminal and the unique identification information of the IC chip to be wirelessly transmitted by way of the communication network for receipt by the information management apparatus, (iii) after wirelessly transmitting the application data, perform a second determination as to whether a response has been received from the information management apparatus, in which the response pertains to a determination performed by the information management apparatus as to whether the number of predetermined conditions are satisfied, and (iv) when a result of the second determination indicates that the response has been received, cause display of a second image on the display of the mobile terminal, wherein the second image comprises information representing that the user is a winner of the reward campaign, and a selectable input, which when selected requests user information pertaining to the user to be wirelessly transmitted for receipt by the information management apparatus such that a respective user who is not provided with the second selectable input is not requested to wirelessly transmit the user information pertaining to the respective user.

6. The mobile terminal according to claim 1, in which the application data further includes user identification information which identifies the user of the mobile terminal such that when the selectable button is selected the application data which includes the address information of the mobile terminal, the unique identification information of the IC chip, and the user identification information is caused to be wirelessly transmitted for receipt by the information management apparatus.

* * * * *